United States Patent [15] 3,639,682

Benmussa et al. [45] Feb. 1, 1972

[54] TELEGRAPH LINE SCANNING SYSTEM

[72] Inventors: Henri Benmussa, Meudon; Ngoc-Sanh Bui, L'Hay-les-Roses; Gerard Troubac, Paris, all of France

[73] Assignee: International Standard Electric Corporation, New York, N.Y.

[22] Filed: Dec. 12, 1969

[21] Appl. No.: 884,432

[52] U.S. Cl. ....................178/3
[51] Int. Cl. ....................H04l 17/16
[58] Field of Search ....................178/3, 4, 23 A

[56] References Cited

UNITED STATES PATENTS 3,349,175 10/1967 Meisingset et al. ....................178/4 X

*Primary Examiner*—Kathleen H. Claffy
*Assistant Examiner*—Thomas W. Brown
*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

A system for detecting transitions and reconstituting characters for slow telegraph lines. Normally, a character is reconstituted at the receiving of the "start" of next character. Therefore a "cam function" has been provided, which reviews one by one the line memories at intervals longer than the duration of a character, so that any character which has been completely received is processed regardless of the lack of a next character.

8 Claims, 7 Drawing Figures

Inventors
HENRI BENMUSSA
NGOC SANH BUI
GERARD TROUBAC
By [signature]
Attorney

Inventors
HENRI BENMUSSA
NGOC SANH BUI
GÉRARD TROUBAC
By [signature]
Attorney

FIG. 4

| | | | |
|---|---|---|---|
| 1 | | rz | 1→MCA; B+1→B |
| 2 | | q0 | 0→A ; 0→M ; 0→N 1→Q |
| 3 | | q1 | 1→DA ; Ct1, B7-4→A (MGR) |
| 4 | | FOM | MGR→M(a,v, EA); 0→DA |
| 5 | | q2 | 0→A ; FEL=EAi(i=B3-0)→N15 |
| 6 | $\overline{N16}$ (v) | q3 | 1→DA ; ct2, B7-0→A (MLR); 0→M; B8-0→N8-0(HC) |
| 7 | N16 (v) | q3 | 1→DA ; ct2, B7-0→A (MLR); 0→M; B10-2→N8-0(HC) |
| 8 | | FOM | MLR→M (EJ, DIS, CAR, HS); 0→DA |
| 9 | | q4 | N8-0—M8-0→N8-0(HC-HS) |
| 10 | EJ | q5 | 0→M20 ($\overline{EJ}$) |
| 11 | $\overline{EJ}$.(N8-4⩾01001) | q5 | 1→M20 (EJ) |
| 12 | $\overline{EJ}$ | q6 | 0→MCA 0→Q |
| 13 | EJ | q6 | 1→DA; 1→0M; 0→N9-0 |
| 14 | | FOM | M→MLR; 0→DA; 0→0M |
| 15 | | q7 | 0→A ; M18-9→N9-0 (DIS, CAR) |
| 16 | FEL | q8 | 11→N9-8 (DIS) |
| 17 | | q8 | 1→DA; Ct3→A(CS); 0→M |
| 18 | | FOM | CS→M (ACER); 0→DA |
| 19 | | q9 | 1→DA; 1→0M; M6-0+1→M6-0 (ACER+1) |
| 20 | | FOM | M→CS (ACER+1); 0→DA; 0→0M |
| 21 | | q10 | 0→A |
| 22 | | q11 | M→A (ACER+1) |
| 23 | | q12 | 0→M |
| 24 | | q13 | 1→DA; 1→0M; N9-0→M18-9(DIS, CAR); B7-0→M7-0(NLG-NLA); 0→MCA; 0→Q |
| 25 | | FOM | M→ACER; 0→DA; 0→0M |

FIG. 5

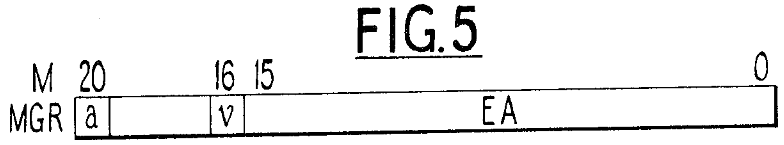

FIG. 6

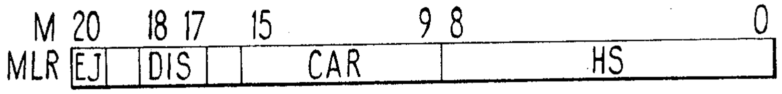

FIG. 7

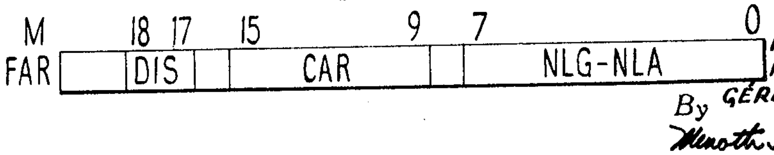

Inventors
HENRI BENMUSSA
NGOC SANH BUI
GÉRARD TROUBAC
By [signature]
Attorney

TELEGRAPH LINE SCANNING SYSTEM

BACKGROUND OF THE INVENTION

The present invention concerns improvements to telegraph signal-receiving systems and more particularly to systems associated with telegraph lines, in order to detect the signals originating from the lines, to process these detected signals and to reconstitute telegraph characters received on each line.

This improved telegraph-signal-receiving system is applicable in telegraph-message-receiving or switching centers, in telegraph automatic exchanges or in any other similar installation.

The well-known telegraph transmission is performed by means of signals which can take two values hereinafter referred as 0 and 1. It is performed character by character. A character always comprises: one beginning signal, so-called "START" element, several information elements, and an end signal so-called "STOP" element. The "START" has a unitary duration and its value is always 0. The number of information elements varies from 5 to 8, according to the alphabet used. Each element has a unitary duration and its value is 0 or 1 according to the information transmitted. The duration of the "STOP" is equal to 1, or 1.5, or 2 elements, according to the alphabet used. Its value is always 1. Between the characters, if, in the case of a discontinued transmission, the value of the transmitted signal remains 1, the line holds the condition corresponding to the "STOP" of the last-transmitted character. The unitary duration of the element is defined by the transmission speed adopted. At 50 Bd, the element has a duration of 20 ms. At 200 Bd, it has a duration of 5 ms.

The reception of telegraph signals implies two operations: observation of the line in order to detect, in the course of time, the value of the signals received, and, processing of the data, originating from the observation of the line, by means of an appropriate time scale; so as to determine the value of each of the elements and to reconstitute the received characters.

It is only necessary to observe the condition of the line periodically during a very short time interval. The frequency of the observations take into account the duration of the elements and the possible distortion. Moreover, it is possible to compare the result of each observation with the one of the preceding observation, in order to detect only the changes of condition or transitions. At the beginning of a character, there is always a transition from condition 1 to condition 0. Then, the direction of the transitions alternates.

In H. Benmussa et al. (39–3–1) U.S. patent application No. 810,260, filed on Mar. 25, 1969, entitled Telegraph-Signal Receiving System, the system is capable of performing such operations. This system comprises an arrangement of lines, a control block, a memory and a clock. The lines are distributed into groups and to each group corresponds, in the memory, a group memory cell. Moreover, to each line there is assigned a line memory cell. By means of a scanner, the control block proceeds with the periodical observation of each group of lines. Simultaneously, it ascertains, in the corresponding group memory cell, the prior conditions of the lines of the group, stored at the previous scanning. A simple comparison indicates which of the lines have changed condition. For each of these lines, it reads the corresponding line memory. This latter contains one time of origin established from the first transition of the character (at the beginning of the "START"), as well as elements of the character already reconstituted. By subtracting the time of origin from the time of the transition to be processed, the control block calculates the place of the transition in the character; it is situated for instance between the second and the third element. If there has not been any transition since the "START," the elements preceding the transition have the same value as the "START," that is to say 0. The next elements will be 1, until a new transition takes place. The reconstituted character is consequently, at that stage, 00111 (five-element characters). When reception is made of a subsequent transition (after the fourth element, for instance), the control block will conserve the elements preceding this subsequent transition and will invert the next ones. This will provide 00110, in the example considered here.

The contents of the line memory cell, thus, develops as and when the character is reconstituted. When a character has been fully received, it remains in the line memory cell until the reception of the "START" of the next character. At this instant the character is read in the memory cell and is transmitted to a utilizing device.

A reconstituted character thus remains in the line memory cell as long as the line remains inactive which, for instance, in case where this character is the last one of a message, may correspond to a relatively long time. During all this time, the clock which provides the various time indications must progress without passing twice through the same position, so that it is possible to assign to the first next transition, a time indication indicating without any ambiguity the time elapsed between the time of origin of the fully received character and this new transition. Such a clock should therefore have a practically unlimited operation cycle—which is inconceivable.

The system described in the French Pat. No. 1,386,330, filed on Nov. 20, 1963, and entitled: Electric Signals Receiving System Applicable Namely To Telegraph Exchanges, provides arrangements which make it possible to reduce the cycle of the clock and, thereby, the size of the registers and memory cells helping to register the time indications. According to this system, the duration of a clock cycle is little longer than the duration of a character. It is therefore necessary to avoid assigning the same time indication to two transitions distant by more than one clock cycle. To this end there is being provided, in each line memory cell, an additional binary element which is set on 1 at the first passing to zero which happens after the origin of a character in course of reconstitution. At the second passing to zero of the clock, if the reconstitution of the character is not terminated (whereas it should be terminated), and the binary element is found on 1; the reconstitution of the character is therefore automatically completed by transmitting it to the utilizing device.

However, this system has the disadvantage of immobilizing the character reconstituting system, at each passing by zero of the clock, in order to update the additional binary element of each line memory cell and to transmit automatically to the utilizing device the characters fully reconstituted. During all the time that these operations last, the character-reconstituting system is not available for accomplishing its main function.

SUMMARY OF THE INVENTION

An object of the invention is to provide a system making it possible to limit to a low value the duration of the clock cycle and thereby avoid the above mentioned disadvantages.

A feature of the present invention is that there is provided a telegraph-signal-receiving system comprising a control block, a clock and a line memory cell assigned to each of the incoming lines; this cell containing: a character which is reconstituted or is in the course of reconstitution, a time corresponding to the beginning of the reception of this character, and a control bit; these different means being so arranged that the control block should process each line memory cell at least once in any time interval equal to the duration of a clock cycle, diminished by the duration of transmission of a character, and, should analyze the contents of the memory cell so as to determine whether the duration imparted to the reconstitution of the character that it contains has expired, or not; and, in the affirmative, should set the control bit in a particular condition, each line memory cell being thus processed by the control block at least once after the end of the reception of a character and before the clock has accomplished a cycle, counted as from beginning time of the reception of this character, so as to write therein an information signifying that the next transition happening on the line will be the beginning of a new character; and this will enable considering the next transition appearing on the line, after this processing, as the beginning of a new character.

Another feature of the invention, the processing defined in the above first feature of the invention is accomplished in a discontinued fashion at the rate of a single line memory cell at a time; the processing of each cell being separated from the processing of the preceding cell by a relatively long time interval; and this enables, thus, leaving the control block free for accomplishing other functions, with the exception of short interruptions spaced out in the time.

According to a feature of the invention, the telegraph-signal-receiving system also comprises a time-base signal generator which starts, at regular intervals, in the control block, the processing defined in the two above-preceding features; the start frequency being chosen such that all the cells be processed in a time interval equal to the duration of a clock cycle diminished by the duration of transmission of a character.

And another feature of the invention, a line memory cell containing, in addition to a character reconstituted, or in course of reconstitution, and the control bit, one origin time characterizing the beginning of this character, the periodic processing of a line memory cell will consist in reading the contents of this cell, in calculating the time elapsed since the origin time up to the time at which the present processing is being performed, and, in setting the control bit into the particular condition if this elapsed time is longer than the duration of transmission of a character.

In a further feature of the invention, the processing of a memory cell comprises, when this latter contains a fully received character: the reading of this character and its transmission onto a utilizing device, the particular condition in which is set the control bit, signifying, moreover, that the character contained in the memory cell has been retransmitted to the utilizing device.

According to another feature of the invention, when a processed memory cell contains a fully received character and the control bit is in the particular condition, interdiction is made of the retransmission of this character to the utilizing device—this retransmission having already been made before.

It is worth noting that when the reconstitution of a character received along a line finishes, the normal condition of the line is the rest condition (condition 1). In the contrary case, the line is in fault condition. It is therefore advisable to provide an arrangement which makes it possible to detect such a fault.

According to yet another feature of the invention, one memory element per line is provided in a memory cell for noting the condition which the line takes at each instant, the memory element corresponding to a line memory cell being analyzed when this cell is being processed; and this makes it possible, if the line is not in the rest condition (condition 1) and if the line memory cell contains a fully received character, to deduce that the corresponding line is in fault, and to add a fault indication onto the character transmitted to the utilizing device.

BRIEF DESCRIPTION OF THE DRAWINGS

Other features of the invention will become apparent from the following description taken in conjunction with the accompanying drawings in which:

FIG. 4, a table completing the diagram of FIG. 3 and illustrating the detailed operating process of the control block BL, in the accomplishment of the operation of automatic ejection of the reconstituted characters onto the cells of the queue FAR of memory ME;

FIG. 5, a word of a group memory cell;

FIG. 6, a word of a line memory cell; and

FIG. 7, a word of a queue memory cell.

DESCRIPTION OF THE PREFERRED EMBODIMENT

Figure 1:
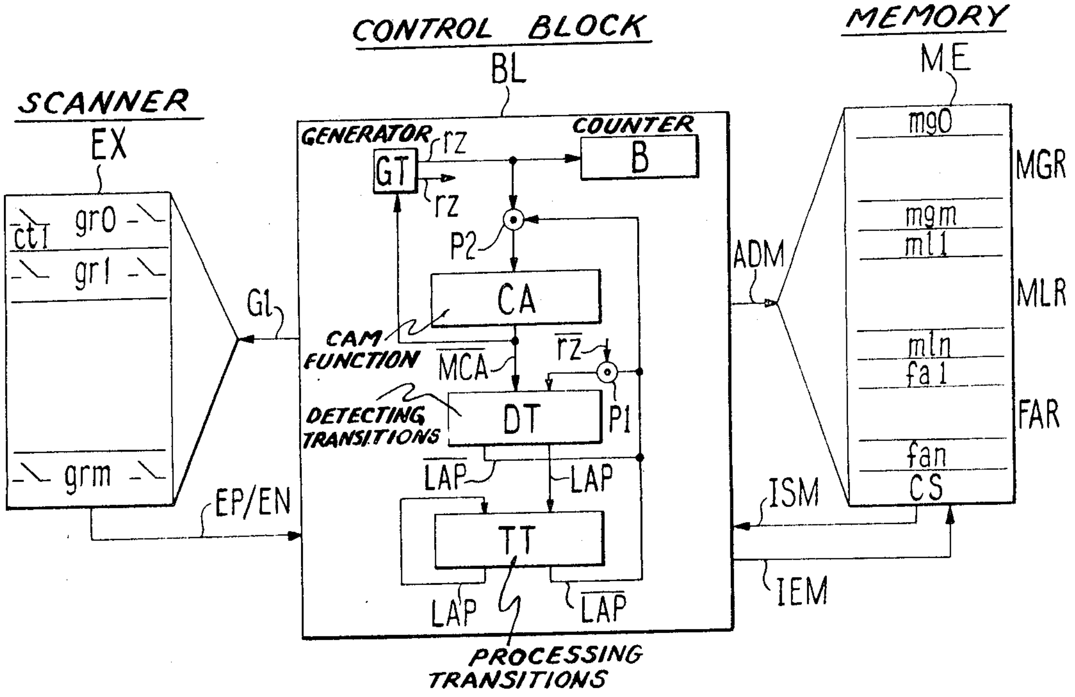
FIG. 1, the block diagram of an embodiment of the improved telegraph-signal-receiving system of the present invention.

An embodiment of the improved telegraph-signal-receiving system according to the invention is described in connection with FIGS. 1 and 2, and comprises three main components. The first one is a scanner EX making it possible to observe the conditions of the telegraph lines, symbolized each by a contact, such as *ct*1. The position of the contact characterizes the condition of the line. It is closed, for instance, when the line is in condition 1, and it is open when the line is in condition 0. The various lines are assembled by groups, *gr*0, *gr*1–*grm*. The number of lines in each group is variable according to application of this system. All the lines of a same group have the same speed. Whereas, the speed is not the same for the various groups.

The scanner EX is orientated onto a group of lines determined by an information that it receives along the conductors *Gl*. It provides in exchange an information characterizing the conditions of the lines of the group along the conductors EP/EN.

The second component in the system of the present invention is the memory ME. This memory, which can be a ferrite core memory of well-known type, comprises namely a group memory MGR, a line memory MLR, a queue FAR and service cell CS. The group memory MGR is made up of a succession of memory cells, *mg*0 to *mgm*, assigned, in the same order, to the groups of lines *gr*0 to *grm*. The line memory MLR is made up of a succession of memory cells, *ml*1 to *mln*, assigned, in same order, to the telegraph lines. The queue FAR is made up of a succession of memory cells such as *fa*1–*fan*, used each for storing a reconstituted character, and, the number of the line along which it has been received, in the destination of a whatever utilizing device such as a message-switching exchange. The service cell CS is used as queue indicator. Its contents indicates at any instant which memory cell of the queue FAR must be used for the next inscription.

To each memory cell there corresponds an address. An address, being provided along the conductors ADM, the corresponding memory cell is read and its contents, so-called "-word," is displayed along the conductors ISM. In the same way, an address being provided along the conductors ADM, as well as a word along the conductors IEM, the word is stored into the memory cell corresponding to the address.

The third component in the system of the present invention is the control block BL. This control block, making use of the information provided by the scanner EX and by the memory ME, ensures the function of detecting the conditions of the telegraph lines and of making appear the transitions of which they are the seat, as well as the function of processing the transitions thus detected, and, reconstituting the characters received on each line. Within the scope of the present invention, it moreover ensures the function of observing one by one, at regular intervals, the line memory cells so as to detect those cells which contain a character whose reconstitution should be terminated because of the time of origin of the character, and, to control consequently the setting of this reconstituted character into a cell of the queue, after having checked that it has not already been set previously into a queue. Such a function will be subsequently called "cam-function" in the present description, because of its repetitive nature.

With the purpose to make appear clearer the general features of the telegraph-signal-receiving system in the present invention, the block BL is being shown in a form that is more functional than specific. Indeed, the rectangle DT represents all the circuits used for the operations which detect the transitions along the telegraph lines. The rectangle TT represents all the circuits used for operations which process the transitions put in evidence by the circuits DT. The rectangle CA represents all the circuits used for the cam function. In other words, the rectangle DT represents the transition-detecting function (function DT); the rectangle TT the transition-processing function (function TT), the rectangle CA the cam function (function CA), quite independently from the fact that, in a material realization, the greatest part of the circuits is used for each function. In order to complete, there is also shown in the figure: a counter B, a time-base signal generator GT and two gates P1 and P2 of AND type. The counter B is used at the same time as a clock and as scanning counter for function CA.

When function DT is taking place, a group of lines is designated. The present conditions of the lines of this group are being observed. Simultaneously, the corresponding group memory cell is being read and it provides the prior conditions of those same lines stored during a previous function DT. These present conditions and the prior conditions are compared, and, for each line having changed condition, the block is switched onto function TT.

In referring to FIG. 2, there will now be described how the function TT enables reconstituting a character.

Figure 2:
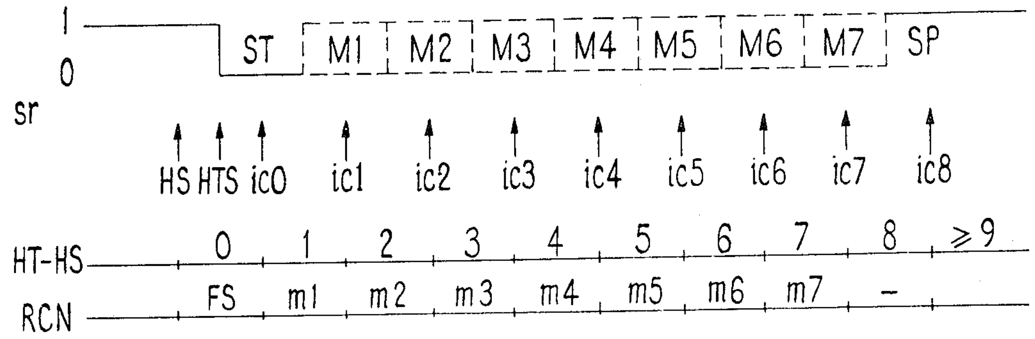
FIG. 2, a telegraph character of 7 information elements and the operations accomplished at the occasion of each transition.

On line *sr* of FIG. 2 there is shown a seven-element character comprising: a "START" ST, seven information elements M1 to M7, a "STOP" SP. The telegraph line is initially in condition 1. It passes onto condition 0 at the characteristic instant HTS, at the beginning of the "START." As soon as this transition is detected by the control block BL, the line memory cell, for instance, *ml*1 is put up to date. This consists in setting to zero the elements of the memory cell which store the character to be reconstituted, and to calculate a time of origin HS, obtained by subtracting from HTS the duration of a half-element. The times at which the transition take place (time HT) are provided by the counter B.

The time of origin HS is placed along the line *sr*, in FIG. 2. On the same line is also placed instants *ic*0 to *ic*8 situated each in the middle of the "START," of the seven elements, and of the theoretical "STOP." Below, on line HT–HS, there is indicated the value (in decimal numbering) of the difference HT–HS in a whole number of elements (without the fractions). The line RCN indicates the operations to be performed.

If the first transition following HTS produces itself between the instants *ic*0 and *ic*1, it must be considered that this is, indeed, the transition separating the "START" from an element M1 equal to 1. The calculation HT–HS gives, actually, a whole number of elements equal to 1 and this provides the indication that the transition precedes the element M1. The elements following the "START" as from M1 inclusive, are not 0, but 1; the result then is written 1111111, and this until a new transition produces itself.

Subsequently, if a second transition produces itself between *ic*3 and *ic*4, the calculation HT–HS gives a whole number of elements equal to 4 and this provides the indication that the transition precedes the element M4. The elements M1 to M3 are 1 and the next elements are 0, the result being written 1110000—at least until detection of a new transition. This does indeed correspond to the successive conditions of the line which, after having passed onto condition 1 just after the "START" restores to condition 0 at the beginning of the element M4.

In a general way when a transition appears, the calculation HT–HS makes it possible, therefore, by defining the whole number of elements elapsed since the time of origin HS and which must remain unchanged, to simply cause the inversion of the value of the next elements.

If a new transition takes place after the characteristic instant *ic*8, then it would be seen in FIG. 2 that this could only be the beginning of the "START" of the next character. In this case, the reconstituted character in the line memory is stored into a cell of the queue FAR where it is going to be seized by the utilizing device.

Such a system is described in detail in the U.S. Pat. application No. 810,260 already mentioned above.

However, as long as no transition is detected after instant *ic*8 which follows the reconstitution of a character, the reconstituted character in the line memory cell cannot be stored into a cell of the queue FAR in the manner just described above. This character, which can for instance be last character of a message, will therefore risk waiting an undetermined lapse of time (until the reception of the beginning of next message), before being stored into the queue. Also, the reconstitution of the characters risks being changed. Indeed, the counter B has an operation cycle of limited duration. Due to this fact, if an interruption happens in the transmission, it will possibly accomplish one or several cycles before the reception of the transition marking the beginning of the next character. If nothing has been provided for ascertaining this fact, the time provided by the counter B might lead to a false interpretation of the position of this transition with respect to the time of origin HS of the preceding character. It may happen, namely that this transition be wrongly considered as being part of the preceding character, which then would have serious consequences on the continuation of reconstitution of the characters.

The cam function CA, according to the present invention, has for purpose to complete the reconstitution of a character whose reception is terminated, and to set it in a queue before counter B will have accomplished a full cycle. According to this system, the function CA is periodically initialized for each line. The interval separating two functions CA for one same line is shorter than an operation cycle of the clock (counter B) diminished of duration of one character.

In referring to FIG. 1, there will now be described the general operating process of the system.

It will be assumed that initially the control block BL is in rest condition. The condition $\overline{LAP}$ is provided. The counter B is in a position. The generator GT provides at regular intervals signals *rz*.

At the first signal *rz*, the counter B steps one step. The gate P2 operates and provides a control signal setting into service the cam function CA.

Function CA consists first in designating a line memory cell (MLR). To that end, a memory address is constituted as from the position of the counter B. This address, transmitted along the conductors ADM, enables reading the corresponding memory cell, say for instance *ml*1. The word contained in this cell (line word) is read and transmitted from the memory ME to the block BL, along the conductors ISM. This word, shown in FIG. 6, comprises namely: a reconstituted character, or in course of reconstitution, CAR; this character's time of origin HS and an information EJ indicating whether this character has already been transmitted to the queue or not. The function CA calculates the difference between the time of origin of the character and the running time (time at which is being performed the function CA) indicated by the counter B, and, it provides a condition if this difference is higher than the time imparted to the reconstitution of the character.

It will be assumed that this condition is provided and that information EJ indicates that the character has not been already transmitted to the queue. Therefore the character must be transmitted onto the queue. Beforehand, the line word is rewritten in the cell *ml*1 by giving to the information EJ a value such as subsequently EJ would indicate that the character has been transmitted onto the queue. This inscription is made by providing the address of the cell *ml*1 (originated from the counter B) along the conductors ADM and the word along the conductors IEM. An address is then constituted and transmitted along the conductors ADM for designating the memory cell CS. The word read in the cell CS provides the address of a cell in the queue, say for instance *fa*1. This address is transmitted along the conductors ADM for designating the cell *fa*1. Simultaneously, the reconstituted character is transmitted along the conductors IEM, and, an order for inscription is provided. The character is stored into the cell *fa*1. The function CA is terminated and the condition $\overline{MCA}$ is provided.

If it is supposed that the difference between the time of origin and the running time is lower than the time imparted to the reconstitution of the character or, that the character has already been transmitted to the queue (information EJ), then the character must not be transmitted to the queue. The function CA is interrupted. The condition $\overline{MCA}$ is provided.

The condition $\overline{MCA}$ controls the switching of the generator GT. This latter ceases to provide the signal *rz* and provides the signal $\overline{rz}$.

The condition $\overline{MCA}$ controls also the setting into service of function DT. Function DT consists, first, in transmitting an information along the conductors G1 in order to orientate the scanner EX and to obtain, along the conductors EP/EN, the conditions of the lines of a determined group, say for instance *gr*0. At the same time, the same information, transmitted along the conductors ADM, enables the reading of the memory cell *mg*0, corresponding to the group of lines *gr*0. The read group word is transmitted from the memory ME to the block BL, along the conductors ISM.

The block BL is thus informed of the present conditions of the lines of group *gr*0 by the scanner EX, and of the prior conditions of these same lines, stored during the preceding scanning in the memory cell *mg*0. The block BL compares these two information items and establishes transition conditions indicating which are the lines that have changed condition. If none of the lines of group *gr*0 has changed condition, the transition conditions are null. The contents of the memory cell *mg*0 is not modified. A signal $\overline{LAP}$ is provided. The gate P1 operates. The function DT, as soon as it is terminated, is restarted automatically for the next group of lines. It is thus performed repeatedly, for the successive line groups, as long as no transition is detected.

Now it will be assumed that when the group *gr*0 is being scanned, the comparison of present conditions with prior conditions provides non null transition conditions, two lines having changed condition, for instance. The function DT, in this case, provides for putting the contents up to date of the memory cell *mg*0, by storing therein the present conditions of the lines given by the scanner EX, in replacement of the prior conditions read previously. On the other hand, the function DT does not provide the signal $\overline{LAP}$ and provides the signal LAP. The control block passes into the execution of function TT.

The function DT which has just terminated, has enabled determining which are the lines of the group *gr*0 along which a transition has been detected. The block BL, right at the beginning of function TT, constitutes the address of the line memory cell, *ml*1 for instance, of the first of the lines having changed condition. This line memory is read and the word it contains provides information on the prior conditions of the line (time of origin of the character, elements already reconstituted etc.) which will enable the block BL to perform the processing operations making it possible to complete the reconstitution of the character whose detected transition is an element.

When the function TT, accomplished in respect of the first one of the two detected transitions, is terminated, the function TT is ended. Yet, there remains a transition condition and the signal LAP mentioned above is still provided, whereas the signal $\overline{LAP}$ is absent. The function TT is simply restarted. It then enables the processing of the second transition.

It is to be noted that if, during a function TT, a processed transition appears as being the beginning transition of the "-START" of a new character, the reconstituted character in the line memory cell is read and then stored into a cell of the queue, if it has not already been transmitted during a prior function CA (information EJ); while, a new time of origin is stored in the line memory cell.

At the instant wherein the processing of the second transition is in its turn terminated, since there has been any other transition, the signal lap disappears and the signal $\overline{LAP}$ appears.

If the generator GT still provides the signal $\overline{rz}$, the gate P1 operates and the function DT is restarted for another group of lines. Whereas, if the signal $\overline{rz}$ ceases being provided and the signal *rz* is provided, the gate P2 operates and controls the starting of function CA. Under the influence of signal *rz*, the counter B has stepped by one step. It is therefore the line memory cell of next rank that will be processed in function CA. The operating process will carry on as just described above.

The circuits necessary for performing functions DT and TT were described in the U.S. Pat. application No. 810,260 already mentioned above.

Now will be described, in referring to FIG. 3, an embodiment of the control block BL of FIG. 1 and, more particularly, of the circuits necessary for the realization of function CA of the present invention.

Figure 3:
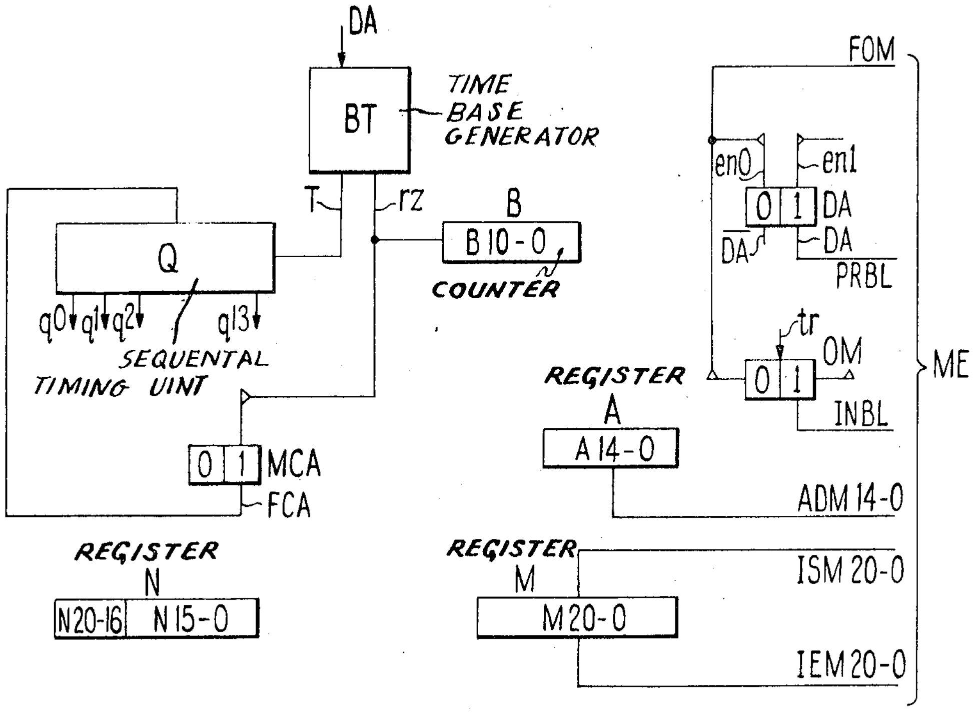
FIG. 3, a simplified circuit diagram of an embodiment of the control block BL in FIG. 1, in which is applied the system of the present invention.

This control block comprises: registers (A, M, N), a counter B, a time-base (generator) BT, a sequential (timing unit) Q, and various logic circuits partly represented in FIG. 3.

The logic circuits are realized mainly by means of bistables and binary counters.

A bistable, such as DA, is shown in the drawing by two juxtaposed squares containing digits 0 and 1. It has two input conductors, *en*0 and *en*1, placed at its upper part and to which are connected one or several inlets. At rest condition, the inlets of the bistable receive positive signals. The two outlets of the bistable, DA and $\overline{DA}$, are placed at the lower part. When the bistable is in position O, it provides a positive signal on the outlet $\overline{DA}$, and a null signal (earth) on the outlet DA. To have it pass onto position 1, it is just necessary to provide it with an earth potential along the input conductor *en*1. The outgoing signals are then permuted. To have it restore to position 0, it is just necessary to provide an earth potential along the input conductor *en*0 (through conductor FOM). Duration of the ingoing signals does not count. The change of condition of the bistable produces itself right at the beginning of the ingoing signal, in a quite negligible lapse of time.

It is worth considering that a binary counter is only a particular bistable, such as OM, having an additional inlet *tr* and two inlets such as those of bistable DA, though they are placed laterally. Its outlets are the same as those of a bistable. The bistable OM triggers, whatever be its position, when a transition takes place between a positive voltage level and null voltage level on its inlet *tr*. This change of position takes place more precisely at the end of the control impulse.

The registers are groups of bistables or binary counters of the types described. Thus, the register A is made up of 15 bistables, A14–0. The registers M and N are made up of 21 binary counters, respectively, M20–0 and N20–0.

The time base BT is a circuit which produces, on the one hand, impulses T the period of which is, for instance, of 1 microsecond; and which are used for controlling the execution of the elementary operations in the block BL. It produces also the signals *rz*, of short duration, at intervals of 312 $\mu$sec. The time base BT operates freely and permanently, as long as it does not receive the condition DA provided by the bistable DA. It will be seen that this condition is provided when the block BL has requested a reading or storing operation in the memory ME. At that instant, the condition DA blocks an outlet of the time base BT, the one which produces the impulses T. This enables stopping temporarily the operation of the block BL, as long as the memory ME has not accomplished the ordered operation.

The counter B is realized by means of binary counters of the type described. It has 11 stages B10–0 (nine of which only will be used within the scope of the present invention) and it therefore provides an 11-bit binary number which is increased by a unit each time a signal *rz* is provided. This counter is utilized as a clock. Its stage BO triggers thus every 312 $\mu$sec., its stage B4 triggers at about every 5 ms., etc. Since at 200 bauds a moment lasts 5 ms., one can immediately see that the time provided by B8–0 is expressed in numbers of elements, if slice B8–4 is considered, and, in one-sixteenth of an element if slice B3–0 is considered.

Moreover, the counter B enables giving the number of the line memory cell processed in cam function CA. If it is considered that there are 16 groups of 16 lines, the slice B7–4 provides the number of the group to which the line belongs and the slice B3–0 the number of the line inside the group.

Since one line is being processed by function CA every 312 μsec., if the control block has for instance to process 16 groups of 16 lines—that is to say 256 lines—then 312×256 or 80 ms. would be necessary for processing them all. As it was already seen above, the interval, which separates two processings in function CA of one same line, must be shorter than the duration of an operation cycle of counter B diminished by the duration of a character. The duration of an operation cycle of counter B must therefore be longer than 80 ms. increased by the duration of a character. If the case is taken here of a 200-baud transmission (duration of one element: 5 ms.) each character of which comprises seven information elements (and, by including the "START" and the "-STOP," at least nine elements for each character), the duration of a character is 5×9=45 ms. The duration of an operation cycle of the counter must therefore be at minimum 80+45=25 ms. This duration, translated into number elements of 5 ms., is of 25 elements. In order to display in binary numeration such a duration, the counter must therefore use at least five bistables. This is why the time, provided by the counter and expressed in whole number of elements, utilizes the five bistables B8–4.

The sequential Q is a circuit that receives the impulses T and provides in exchange, in succession, time impulses q0, q1, q2–q13. It can be realized in the form of a counter and of decoding circuits. At the beginning of each function, the sequential Q starts in position 0 (q0). The first impulse T is translated by a time impulse q0. At the end of this impulse, the counter passes onto position 1. The second impulse T will thus provide the time impulse q1, and so on. The sequential Q steps therefore automatically, step by step, until the function is ended; then a control impulse restores it to position 0. When the block BL is in rest condition, the bistable MCA is in position 0. The condition FCA is not therefore provided, and the bistable MCA provides an earth on its right outlet blocking the operation of the sequential which ceases to utilize the impulses T and to provide the time impulses.

In order to communicate with the memory ME, the block BL comprises the bistables DA and OM, the address register A and the memory register M. When the block BL has to read a memory cell ME, the address (15 bits) is written in the register A which displays it, towards memory ME, upon the conductors ADM14–0. The bistable DA is moreover set into position , by means of a control signal not shown in the figure. It transmits a call signal along conductor PRBL. In response to this call signal and as soon as it is available, the memory ME performs the requested reading operation and provides the information read, or word, of 21 bits upon the conductor ISM20–0. This word is written in the register M. When the reading operation is terminated, the memory ME also provides an earth potential along the conductor FOM. The bistable DA is then restored to position 0, in order to make the call of the memory ME to cease.

When the block BL has to register a word in the memory ME, the address is written in the register A, the word to be registered is written in the register M and the bistables DA and OM are set into position 1. The address is displayed along the conductors ADM14–0, the word to be registered is displayed upon the conductors IEM20–0, the call signal is provided along the conductor PRBL and a writing request signal is provided along the conductor INBL. In response, the memory ME accomplishes the requested writing operation. Then, it provides the earth along the conductor FOM, and this restores the bistables DA and OM into position 0.

Finally, the register N is used mainly for registering the hour indication provided by the counter B at the instant wherein function CA is being accomplished and for evaluating, by subtraction of the hour of origin of the character in the course of reception, if the delay imparted to the reception of this character is terminated or not.

Now will be described the detailed operating process of the control block BL of FIG. 3, in the accomplishment of function CA, by referring to the table in FIG. 4. It will be assumed that the processed line in function CA is a line whose transmission speed is of 200 bauds and the alphabet used has 7 information elements. The operation of the control block BL is, besides, analogous for the lines employing other transmission speeds and other alphabets.

The table in FIG. 4 comprises, from left to right, line numbers; the essential logic conditions determining the performance of operations, the time at which the operations are performed (position of sequential) and the enumeration of the accomplished operations. Each line corresponds to one or several operations performed in a same time.

One can, to a certain extent, consider that this table corresponds to the detailed diagram for realizing this block BL. Indeed, it is quite easy to establish as from this table: a list indicating, for each circuit element, the operations in which it intervenes by way of data transmitter; a list indicating, for each circuit element, the operations in which it intervenes by way of data receiver; a list of the operators necessary for accomplishing the intended operations. Besides, these operations are clearly defined (data sources, types of operations, data receivers) and are, after all, well known in the art (loading, unloading of registers; incrementation, decrementation of a binary number; data sums and products according to Boolean algebra; etc.), as well as means enable realizing them. Consequently, one would rightly conclude that this table constitutes a particular mode of presenting detailed logic circuits. They offer the advantage of permitting a clear description of a complex logic equipment.

It will be assumed that initially the bistable MCA is in position 0. It therefore does not provide the condition FCA but an earth potential which blocks the operation of the sequential Q.

It will be assumed also that all the other bistables and registers are in position 0. Whereas, time base BT operates and provides the impulses T, transmitted to the sequential Q, as well as the impulses *rz*, of same duration as the impulses T, but spaced by 312 μsec. The counter B is in a whatever position.

The block BL is in a waiting position and does not accomplish any operation.

Now it will be assumed that the time base BT provides the signal *rz*. This signal sets the bistable MCA into position 1 (1→ MCA) and causes the counter B to step by one step (B+1 → B). These operations are indicated in line 1 of the table in FIG. 4.

The bistable MCA provides the condition FCA. The sequential Q is thus released. Then, as soon as the time base BT originates an impulse T the sequential Q provides the time impulse q0, or more simply, the time q0; and then it passes onto position 1. The passing of the sequential Q into position 1 is noted in the line 2 of the table in FIG. 4. It has been underlined because it marks the effective starting of function CA.

At time q0 (line 2), without any condition (there will not be mentioned here the condition FCA which is necessary for all the operations), the registers A, M and N are restored into position 0 (if needs be).

At time q1 (line 3), the bistable DA is set into position 1, a constant C*t*1 and the contents B7–4 of a part of the counter B are stored into the register A. The bistable DA provides a signal along the conductor PRBL for calling the memory ME (FIG. 3). The constant C*t*1 is the initial address of the memory area MGR (FIG. 1) in the memory ME. The contents of B7–4, added to C*t*1, enables designating one of the cells MGR. The initial address of the memory area MGR can advantageously be such as to have its four bits of low weight be 0, so that the constant C*t*1 may provide the 11 bits of heavy weight and that the counter B may provide the four bits of low weight; the addition thus resuming itself to a juxtaposition.

The bistable DA remains in position 1 as long as the requested reading operation is not accomplished. It provides a condition DA which, as indicated above, blocks a part of the time base BT and prevents the originating of impulses T. Due to this, thus, the operation of block BL is suspended.

When the reading requested from memory ME is performed, a group word read in the designated memory cell will be written in the bistables M20–0 of register M (FIG. 3). This word is shown in FIG. 5. One can immediately see that it comprises: one bit of rank 20, so-called *a*, indicating the alphabet used on the group lines (two possible types of alphabet); one bit of rank 16, so called *v*, indicating the adopted speed of transmission along the group lines (two possible speeds); 16 bits of ranks 15 to 0, so-called EA, indicating what were the conditions of the group lines at the latest scanning made. This information will be written in the bistables of corresponding ranks of the register M, as indicated in line 4 of the table in FIG. 4. Practically at the same instant, the memory ME provides a signal FOM, noted upon the same line as a time signal and which restores the bistable DA into position 0.

The bistable M16 of register M indicates the transmission speed adopted on all the lines of the group. Two speeds are provided. In the example chosen here, if the bistable M16 is in position 0, the speed is 200 bauds; if the bistable M16 is in position 1, the speed is 50 bauds. As was already mentioned above, it will be assumed that the speed is 200 bauds (M16=0).

The bit *a* provided by the bistable M20, and indicating the alphabet used on the group lines, is not utilized within the scope of the present invention.

When the bistable DA has restored to position 0, the time base BT can take up again its normal operation, and, at first impulse T, the sequential Q will provide the time *q*2.

At time *q*2 (line 5), the register A is restored to zero. The number of the line to be processed by function CA, provided by the bistables B3–0 of counter B, enables addressing the appropriate bistable among M15–0. This bistable provides an information indicating what was the condition of the line at the latest detection scanning of the transitions performed. If the line was in condition 0, this information is $\overline{EAi}$. The condition FEL is then provided and written in the bistable N15 of register N. This operation is noted $$FEL=\overline{EAi}\xrightarrow[(i=B3-0)]{}N15$$

upon line 5 of the table in FIG. 4. In referring to FIG. 2, it is seen that the condition 0 is the reverse condition of the STOP and corresponds to the START or to an element of a character. Normally, a character is therefore in the course of reception. The block BL continues, however, the processing in function CA. If, as will be seen subsequently, this processing lets appear that the time imparted to the reconstitution of the character has elapsed, it will be necessary to conclude that the line is in an abnormal condition. Indeed, by referring to FIG. 2, it is seen that one is placed beyond the time *ic*8 and the line should be in condition 1. The character will be stored into a cell of the queue, and the condition FEL will enable adding to this character an indication of error.

At the time *q*3 (line 6), the condition $\overline{N16}$ (*v*) being provided, the bistable DA is set into position 1; a constant C*t*2 and the contents B7–0 of counter B are written in the register A. Same as before, the setting upon 1 of the bistable DA has for effect to call the memory ME. The constant C*t*2 is the initial address of the memory area MLR (FIG. 1) in the memory ME. The contents B7–0, added to C*t*2, enables designating a line memory cell. In the same manner as for the constant C*t*1, the constant C*t*2 could be such as to be able to provide the seven bits of heavy weight of the designated cell address and B7–0 the eight bits of low weight, the addition thus resuming itself to a juxtaposition.

At the same time, the register M is restored to position 0. The contents B8–0 of counter B, representing the running time HC at which the present function CA is being performed, is written in the bistables N8–0 of register N.

The bistable DA, in position 1, provides the condition DA which blocks the time-base BT. The operation of block BL is therefore again suspended.

When the reading requested from the memory ME is performed (line 8), the word read in the designated memory cell will be written in the register M. This word is shown in FIG. 6. It comprises: a bit or rank 20, so-called EJ, which is 1 if the reconstituted character in the line memory cell has already been stored in a cell of the queue FAR and which is 0 in the contrary case; two bits of ranks 18 and 17, so-called DIS, giving an indication of distortion; seven bits of ranks 15 to 9 representing the character CAR in course of reconstitution; nine bits of ranks 8 to 0 providing the time of origin of this character. During this time, the signal FOM restores the bistable DA into position 0. The condition DA is removed, and the time base BT recommences to provide impulses T.

At the time *q*4 (line 9), the time of origin HS (M8–0) is subtracted from the running time HC (N8–0) at which is being performed the present function CA. This difference is written in the bistables N8–0 of register N.

The different HC–HS represents the time elapsed since the time of origin corresponding to the last received "START." By referring to FIG. 2, it is seen that a character extends from the time HS up to the characteristic instant *ic*8, upon nine elements. If the difference HC–HS is equal or superior to nine elements, or HC–HS ≥ 01001 in binary notation, it can be considered that the character has been fully received and that it has therefore to be stored in a cell of the queue FAR (if it has not already been done so). Moreover, if it is supposed that the character CAR has not been stored in a cell of the queue, the condition $\overline{EJ}$ ($\overline{M20}$) is present.

At time *q*5 (line 11), a circuit controls the setting into position 1 of the bistable M—20 (EJ) of register M, if at the same time are present condition $\overline{EJ}$ and condition HC–HS ≥ 01001, that is to say the condition $\overline{EJ}$. (HC–HS ≥ 01001).

At time *q*6 (line 13), condition EJ being provided, the bistables DA and OM are set upon 1; the bistables N9–0 are set in position 0. The setting upon 1 of the bistables DA and OM has for effect to call the memory for controlling the writing, of the word contained in the register M, into the line memory cell whose address is contained in the register A. It is seen, therefore, that rewriting is made, into the preceding line memory cell, of the same word as the one already read after having simply changed from 0 into 1 the value of the indication EJ. Thus, at a subsequent processing of the same line by function CA, if of course no other character is received meanwhile on this line, it will be known that as condition EJ has been provided, then the reconstituted character will have already been stored into a cell of the queue FAR. Moreover, when a transition is subsequently received on this line, the condition EJ will indicate that the delay for receiving the character presently considered has been overpassed. Accordingly, this new transition will automatically be considered as the beginning of a "-START."

When the inscription, requested from the memory ME, is made (line 14), the signal FOM is provided. The bistables DA and OM are restored into position 0.

At time *q*7 (line 15), the register A is restored into position 0; the contents of M18–9 (DIS, CAR) is transferred into N9–0.

At time *q*8 (line 17), the bistable DA is set into position 1, in order to call the memory ME for a reading operation; a constant C*t*3 is loaded into register A. This constant is the address of a memory cell CS (FIG. 1).

The reading is made (line 18) and the word contained in the memory cell CS is written in the register M. This word comprises an address, so-called ACER, of one of the memory cells of the queue FAR in which are stored the characters received and wholly reconstituted. The address ACER has 15 bits. The nine first ones, for instance, received by M14–6 are constant, whereas the six last ones, received by M5–0 can take up all possible values. The queue comprises thus $2^6$=64 consecutive addresses utilized in turns, cyclically, for the registering of the reconstituted characters. It is calculated-account being taken of the traffic and of the speed of the operation of the utilizing device—in such way that it never be filled up.

In the same time, the signal FOM is provided and the bistable DA is restored into position 0.

At the time $q9$ (line 19), the bistables DA and OM are set into position 1 for controlling a writing operation. At the same time, the value contained in the bistables M6–0 of register M, that is to say the variable part of the address ACER, is increased by one unit (ACER+1).

Then, the requested writing is being performed (line 20). It enables rewriting in the memory cell CS the read information, increased by one unit, and this prepares the setting into queue of the next reconstituted character.

At time $q10$ (line 21), the register A is restored to zero.

At time $q11$ (line 22), the address ACER+1 is transferred from M into A.

At time $q12$ (line 23), the register M is restored to zero.

At time $q13$ (line 24), the bistables DA and OM are set into position 1, in order to call the memory ME for a writing operation. At the same instant, the distortion information DIS and the reconstituted character CAR, provided by N9–0, are written on the bistables M18–9; the number of the line group to which belongs the processed line (NLG) and its number in this group (NLA), provided by B7–0, are written on the bistables M7–0. The information written in the register M, and shown in FIG. 7, constitutes a word to be written in a queue.

Still at time $q13$, the bistable MCA is restored to position 0. The condition FCA is no longer provided, and this controls the blocking of the sequential Q and its restoring to 0.

Moreover, the bistable DA being in position 1, the condition DA is provided. The time base does not originate any impulses T.

During this time, the word formed upon the register M is written in the address memory cell ACER+1.

The signal FOM is then provided. The bistables DA and OM are restored into position 0 (line 25).

The block BL is in its initial position and becomes available for accomplishing other functions (such as the transition detecting and processing functions described in the patent application mentioned above), until the originating of the next impulse $rz$ (312 μsec. later), instant at which the function CA will be performed by the next line designated by the counter B.

It is seen therefore that the reconstituted characters are automatically filed in a queue, even if they are not followed by other characters. They are thus put at the disposal of utilizing device which will read them and utilize them according to its needs. Moreover, each line is processed by the function CA at least once during an operation cycle of the counter B diminished by the duration of reception of a character, as indicated before, and thus is avoided all erroneous processing of the detected transitions.

Having described the case wherein a reconstituted character in a cell MLR has been stored into a cell of the queue FAR, by means of the function CA, there will now be considered the cases where such a character must not be ejected. In such cases, it is unnecessary to perform the function CA in full. It is recommendable to interrupt it as soon as there is realized that the character must not be stored, in order to avoid immobilizing unnecessarily the control block BL.

A character from a cell of MLR must not be stored into a cell of the queue FAR, if it is not fully reconstituted, that is to say if the difference HC–HS, calculated prior to time $q4$ (line 9), is smaller than 01001 (nine characteristic elements), or if it has already been stored (read bit EJ equal to 1).

First will be examined the case where the character is not fully reconstituted (HC–HS<01001). The operating process is identical to the preceding one until the time $q5$). The condition $\overline{EJ}$. (HC–HS ≥ 01001) is not realized. Therefore nothing happens at $q5$.

At time $q6$ (line 12), the condition $\overline{EJ}$ being provided, the bistable MCA is restored into position 0. The signal FCA is no longer provided. The sequential Q is restored to zero and blocked in that position. The block BL is once more in its initial position, ready to perform other functions.

Now will be considered the case where the character has already been ejected into queue FAR, by a preceding function CA.

The operation progresses, as described above, until the time $q4$.

At time $q5$ (line 10), the condition EJ being then provided by the bistable M20, this same bistable is set into position 0 ($\overline{EJ}$).

At time $q6$ (line 12), the bistable MCA is set into position 0 and, as in the preceding case, this causes the blocking of the sequential Q and its restoring to zero position. The block BL is once more in its initial position, ready to accomplish other functions.

It is worth noting that the contents of the line memory cell has not been modified and that, consequently, in this letter, the bit EJ has remained upon 1, continuing to characterize the fact that it contains an entirely received character.

Finally, it is worth considering the case, already mentioned above, wherein, beyond the instant $ic8$ (FIG. 2), the line upon which bears function CA is found in condition 0. Now, by referring to FIG. 2, it is seen that it should have passed onto condition 1 (corresponding to the "STOP"). It is therefore necessary to consider that the transmission is in fault and it is necessary to give a fault indication (DIS) conveying this fact, to the character ejected in the cell of the queue FAR. The fault indication DIS will then take the value 11.

At time $q1$ (line 4) it was seen that the register M displays on the bistables M15–0 the conditions of the lines of the group of which the line processed in function CA is part. These conditions were obtained during the latest transition detecting scanning.

At time $q2$ (line 5), the bistable corresponding to the line memory cell processed by the function CA is designated by the contents of B3–0 and if, according to the case considered, the line is in condition 0, this bistable provides the condition $\overline{EA}i$. The condition $$FEL = \overline{EA}i_{(i=B3-0)}$$

is provided and is stored in the bistable N15 of register N. The operation of block BL progresses until time $q7$.

At time $q8$ (line 16), the condition FEL being provided, the bistables N9–8 of register N are set into position 1 and provide the indication DIS=11. This indication signals the abnormal condition of the line.

The operation progresses up to time $q13$, wherein the indication DIS is written, with the reconstituted character CAR, upon the register M; and then into a cell of the queue FAR.

It will now be projected to process, in function CA, a line memory cell concerning a line utilized with the same alphabet (seven elements) but with a speed of 50 bauds.

The speed is therefore four times lower than at 200 Bd. This amounts to saying that all the events happening on the line must be considered in respect to a scale of times four times more extended, or, with respect to a clock four times slower. Consequently, in a general way, every time that it will be necessary to refer to the times, a clock will be used which is made up of stages B10–2 of counter B; the stages B1–0 introducing the necessary division by four.

As was indicated in the above description, the speed is specified, for each line group, by a bit $v$, which is short: the bistable M16. When speed of 50 6), bit $v$ is 1 and the bistable N16 provides the condition N16. The condition N16 is absent.

The operating process of the control block BL is the same as the one just described above, in all cases, at one exception short: at time $q3$ (line 7 instead of line 6), the current hour, HC, loaded on the bistables N8–0 is provided by the stages B10–2 of counter B.

It is possible, in the same way, to provide other speeds, by utilizing other clocks for supplying the time. In the case where these speeds are not binary multiples or submultiples of 200 Bd, it would just be necessary to provide appropriate counters.

We claim:

1. A system for the reception of telegraph signals comprising:

a control block, a clock and a line memory cell assigned to each incoming line, said cell containing a reconstituted character, or a character in the course of reconstitution, all the line memory cells to detect those cells which contain a character whose reconstitution should be terminated because the time required to reconstitute the character has expired, and to consequently control the setting of this reconstituted character into a cell of a file, after checking that this character has not previously been set into said file. a time indication corresponding to the beginning of the reception of this character, and a control bit;

said control block adapted to observe each line memory cell at least once in any time interval equal to the duration of a clock cycle diminished by the duration of transmission of a character, and to analyze the contents of the memory cell in order to determine whether the duration for the reconstitution of the character it contains has expired;

said control block to set the control bit into a particular condition when said duration has expired, and in this manner each line memory cell is processed by the control block at least once after the end of the reception of a character and before the clock completes a cycle counted from the time of the reception of this character, so as to write, therein, an information signifying that the next transition on the line will be the beginning of a new character, whereby the next transition appearing on the line after this processing can be considered as the beginning of a new character.

2. A system for receiving telegraph signals comprising:

a scanner adapted to observe the conditions of telegraph lines, the lines being assembled in groups so that all lines of a same group have the same speed, and said scanner to provide an information characterizing the conditions of the lines of the group;

a memory including a line memory cell assigned to each incoming line, said cell containing a complete or partially reconstituted character, a time indication corresponding to the origin of reception of this character, and a control character; and a control block coupled to said scanner and memory to detect the conditions of said lines, to process the transitions detected, and to reconstitute the characters received on each line, said control block to observe one by one, at regular intervals, 3. The system of claim 2 including in the control block a time-base signal generator which starts, at regular intervals, the processing of each cell, and the start frequency of the generator is chosen so that all the cells are processed in a time interval equal to the duration of a clock cycle diminished by the duration of transmission of a character.

4 The system according to claim 3 including, for the periodic processing of a line memory cell, means for reading the contents of this cell, means for calculating the time elapsed since the time of reception of the contents up to the time at which the present processing is being performed, and means for setting a control bit into a particular condition end elapsed time is longer than the duration of transmission of a character.

5. The system according to claim 3 including, for the processing of a memory cell when it contains a fully received character, means for reading of this character and its transmission onto a utilizing device, and the particular condition which is set in the control bit indicates that the character contained in the memory cell has been retransmitted to the utilizing device.

6. In a system for the reception of telegraph signals and comprising a control block, a clock and a line memory cell assigned to each incoming line, the cell containing a reconstituted character, or a character in the course of reconstitution, a time indication corresponding to the beginning of the reception of this character and a control bit, the method comprising the steps of:

processing each line memory cell at least once in any time interval equal to the duration of a clock cycle diminished by the duration of transmission of a character;

analyzing the contents of the memory cell in order to determine whether the duration for the reconstitution of the character it contains has expired;

setting, if in the affirmative, the control bit into a particular condition, so that each line memory cell is observed by the control block at least once after the end of the reception of a character and before the clock has completed a cycle counted from the time origin of the reception of this character;

writing an information signifying that the next transition happening on the line will be the beginning of a new character; and considering the next transition appearing on the line after this processing, as the beginning of a new character.

7. The method of claim 6 including, for the periodic processing of a line memory cell, the steps of:

reading the contents of this cell;

calculating the time elapsed since the time of reception of the contents up to the time at which the present processing is being performed; and setting the control bit into the particular condition if this elapsed time is longer than the duration of transmission of a character.

8. The method of claim 6 including, for the processing of a cell containing a fully received character, the steps of:

reading of the character;

transmitting to a utilization; and setting the control bit into the particular condition indicating that the character has been transmitted to the utilization device.

* * * * *